(12) United States Patent
    Dominique

(10) Patent No.: US 10,287,186 B2
(45) Date of Patent: May 14, 2019

(54) REGENERATION OF MIXED BED RESINS

(71) Applicant: Ovivo Inc., Montreal (CA)

(72) Inventor: Gensbittel Dominique, Michelbach-le-bas (FR)

(73) Assignee: Ovivo Inc., Montreal (CA)

( * ) Notice: Subject to any disclaimer, the term of this patent is extended or adjusted under 35 U.S.C. 154(b) by 0 days.

(21) Appl. No.: 15/566,652

(22) PCT Filed: Apr. 13, 2016

(86) PCT No.: PCT/IB2016/000590
§ 371 (c)(1),
(2) Date: Oct. 13, 2017

(87) PCT Pub. No.: WO2016/166602
PCT Pub. Date: Oct. 20, 2016

(65) Prior Publication Data
US 2018/0105439 A1    Apr. 19, 2018

Related U.S. Application Data

(60) Provisional application No. 62/148,059, filed on Apr. 15, 2015.

(51) Int. Cl.
| | | |
|---|---|---|
| *C02F 1/42* | (2006.01) | |
| *B01J 47/04* | (2006.01) | |
| *B01J 49/07* | (2017.01) | |
| *B01J 49/09* | (2017.01) | |
| *B01J 49/50* | (2017.01) | |

(52) U.S. Cl.
CPC ............... *C02F 1/42* (2013.01); *B01J 47/04* (2013.01); *B01J 49/07* (2017.01); *B01J 49/09* (2017.01); *B01J 49/50* (2017.01); *C02F 2001/427* (2013.01); *C02F 2303/16* (2013.01)

(58) Field of Classification Search
CPC .. C02F 1/42; C02F 2001/427; C02F 2303/16; B01J 47/04; B01J 49/07; B01J 49/09; B01J 49/50
USPC .................................................... 521/523, 26
See application file for complete search history.

(56) References Cited

U.S. PATENT DOCUMENTS

| | | | | |
|---|---|---|---|---|
| 4,191,644 A | * | 3/1980 | Lembo ..................... | B01J 49/09 210/675 |
| 4,298,696 A | * | 11/1981 | Emmett ................... | B01J 49/09 521/26 |
| 4,806,236 A | * | 2/1989 | McCormack ............ | B01J 39/04 210/194 |
| 6,187,826 B1 | * | 2/2001 | Viscardi ................... | B01J 49/09 210/284 |

OTHER PUBLICATIONS

Kunin, Robert; McGarvey, Francis X., "Monobed Deionization with Ion Exchange Resins", Industrial and Engineering Chemistry, Mar. 1951, vol. 43 (3), pp. 734-740.

* cited by examiner

*Primary Examiner* — Michael Bernshteyn
(74) *Attorney, Agent, or Firm* — Thomas M. Freiburger

(57) ABSTRACT

In an ion-exchange separation system, a single regeneration column provides for separation of anion and cation resins and the regeneration of both cation and anion resins with a very low level of cross-contamination. After regeneration most of the anion layer in the column is withdrawn, and most of the cation layer is withdrawn, but a portion of each layer adjacent to the interface between the layers remains in the column, to isolate these cross-contaminated portions from the regenerated resins. The withdrawn, regenerated anion and cation resins are placed back into the working vessel.

9 Claims, 3 Drawing Sheets

MIXED BED RESIN TRANSPORT

BACKWASH / SEPARATION

REGENERATION

RINSING

ANION RESIN TRANSPORT

REGENERATION OF MIXED BED RESINS

BACKGROUND OF THE INVENTION

This application claims priority from international application number PCT/IB2016/000590, filed Apr. 13, 2016, which claimed benefit from provisional application No. 62/148,059, filed Apr. 15, 2015.

The invention relates to water treatment using mixed bed separators. In particular the invention concerns regeneration of the cation and anion resins in a mixed bed separator with minimal cross-contamination.

Ion-exchange resins are widely used in different separation, purification and decontamination processes. Common examples are water softening and water purification. The resins are often used in a mixed bed containing both anion resins and cation resins in a working vessel through which water is passed for ion exchange to remove contaminants. The use of ion-exchange resins is often an alternative to use of natural or artificial zeolites.

The resins form an insoluble matrix or support structure usually in the form of small beads (approximately 0.5 to 1 mm diameter), fabricated from an appropriate organic polymer such as polystyrene sulfonate. Usually the resin beads are porous so as to provide a high surface area. Trapping of ions on the bead surfaces occurs with the simultaneous release of other ions in the ion exchange process carried out by the ion resin beds.

Anion resins used in ion exchange are strongly or weakly basic, so as to attract anions, which are negatively charged. Cation resins are strongly or weakly acidic, so as to attract cations, which are positively charged.

In an ion exchange process the resin beads must be regenerated periodically, since they become saturated. Regeneration of anion resins typically involves treatment of the resin beads with a strongly basic solution, such as aqueous sodium hydroxide. Regeneration of cation resins is typically done with a strongly acidic solution, such as hydrochloric acid or sulfuric acid. During regeneration the regenerant solution is passed through the resin bead and trapped ions are released, by combining with the regenerant chemical, thereby renewing the resin's exchange capacity.

Mixed bed resins comprise both cation and anion resins intermixed in a working vessel. When regeneration is needed, the cation resin beads must be separated from the anion resin beads, then each separately regenerated with the respective regenerant acidic or alkaline chemical. Known processes for mixed bed regeneration have included transporting the mixed bed resin from the working vessel to a specially dedicated separation column, e.g. a tall column of relatively small diameter which might have a cylinder height of about four meters to contain a mixed resin bed of about two meters (100% free room). In this column, a backflush of water, upward through the bed of mixed media, will cause the less dense anion resin beads to rise above the cation resin beads, thus forming an anion layer separate from and above a cation layer.

Regeneration of the cation and anion resins has then been accomplished by several different processes prior to the current invention. In one process the anion and cation layers have been regenerated simultaneously, with an alkaline solution passed downwardly through the anion layer while at the same time an acid solution was directed upwardly through the cation layer. Both regenerant chemicals, spent from regenerating the respective ion resin layers, were directed out of the column through one or more exit ports at the level of the interface between the two layers. The anion and cation resins were then rinsed and mixed again as the resins were returned to a working vessel. Use of this method has resulted in a significant cross-contamination region of resin above and below the interface or separation plane between the cation and anion resin layers. The cross-contamination made the mixed bed resin less effective in removing contaminants, in the working vessel.

Another prior method has been to separate the anion and cation resins in one column, using a water backflush as discussed above, but then the two layers were separately transferred into two different columns, where the cation and anion resins were regenerated separately, with little cross-contamination (normally no more than about 0.2%). With the withdrawal of the cation and anion layers a mixing zone at and adjacent to the interface was deliberately left in the separation column. The mixing zone typically comprised a region about 20 to 30 cm in height. Once the cation and anion resins were separately regenerated, they were mixed and/or transported back to the working vessel.

In a variation of the three-column system described above, a two-column system has also been used, wherein the anion resin layer was removed prior to regeneration into a second column, then regenerated in the second column, while the cation layer remained in the separation column and was regenerated in that column. After the separate regenerations the two resins were then mixed in the second column and then transported back to the working vessel. Again, a cross-contaminated layer was left in the separation column.

U.S. Pat. No. 4,191,644 describes processes similar to the above.

Single-column regeneration of anion and cation resins is inefficient, with approximately 10% cross-contamination which remains in the resin bed when returned to the working vessel. Regeneration involving two or three separate columns is far more effective in producing cleanly regenerated resins but is considerably more costly. It would be desirable to employ a process that achieves efficient regeneration using only a single column.

SUMMARY OF THE INVENTION

The invention employs a single column for separation and regeneration of both cation and anion resins, with a very low cross-contamination level, comparable with the level characteristic of the above-described more complex and costly two-column and three-column systems.

In the process of the invention, the mixed bed resins are transferred to the single separation/regeneration column. In that column, the mixed bed resin is first separated using backflush (upflow) water, to divide the bed into two well stratified cation and anion layers. A regenerating acid, such as HCl, is distributed through the cation layer, while a base, such as NaOH, is distributed through the anion layer above. The spent acidic and basic regeneration liquids are collected at the interface between the two layers and removed from the column. Preferably a water rinsing step is then employed, which can be directed downward through the anion layer and upward through the cation layer.

Next, the well regenerated top anion layer, which is most of that layer, is transferred back to the working vessel, and the well regenerated bottom cation layer is transported back to the working vessel. The two layers are mixed within the working vessel.

Importantly, an intermediate zone from the column is left in the column. This intermediate zone includes a bottom cut of the anion layer and an adjacent top cut of the cation layer, approximately 15 to 20 cm from each, this portion including considerable cross-contamination, thus less regenerated resin. This is accomplished by withdrawing the anion layer from a position 15 to 20 cm above the interface, and then withdrawing the cation layer from the bottom, until a desired depth of resin remains, which would be the intermediate, cross-contaminated zone.

The contaminated intermediate layer or zone simply remains in the column, and when another batch of mixed resin is introduced to a column for regeneration, the process is repeated, so that a sustained volume of regenerated mixed resin is returned to a working vessel with each regeneration procedure.

It is a primary object of the invention to separate and regenerate mixed bed ion exchange resins within a single column, while achieving the benefits of more complicated processes involving two or three separate columns. These and other objects, advantages and features of the invention will be apparent from the following description of a preferred embodiment, considered along with the accompanying drawings.

DESCRIPTION OF PREFERRED EMBODIMENTS

Figure 1:
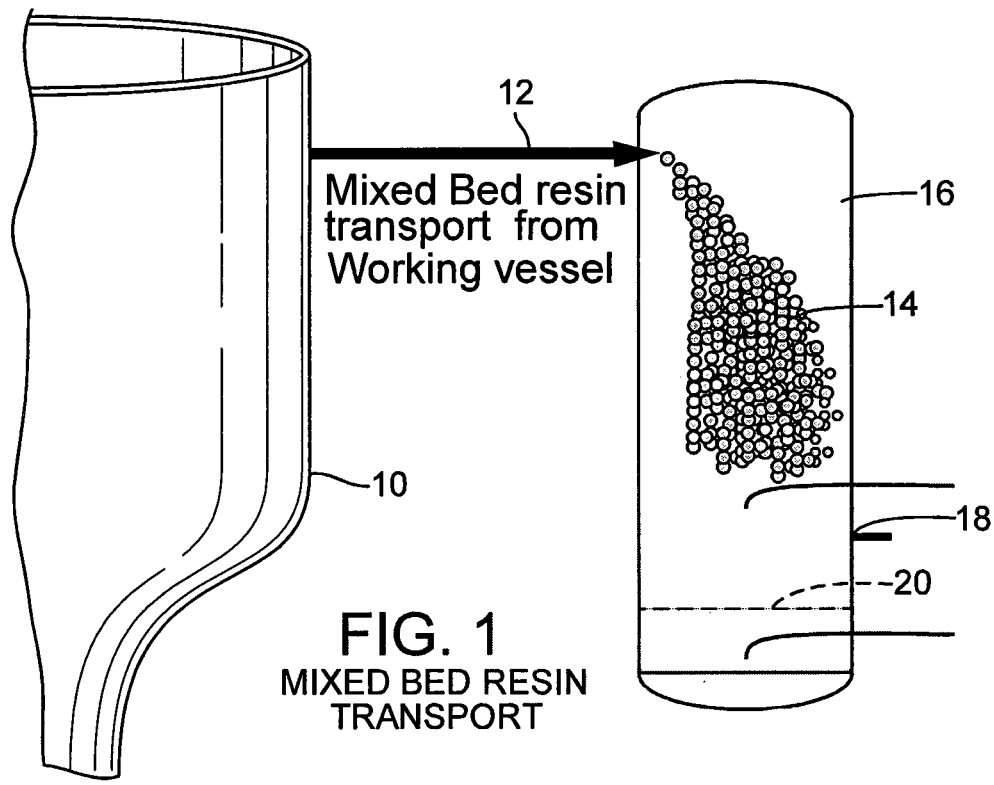
FIG. 1 is a schematic view indicating transport of mixed bed resins from a working vessel to a separation/regeneration column.

In the drawings, FIG. 1 shows a working vessel 10 for ion exchange water treatment. The arrow 12 indicates transport of a mixed bed ion exchange resin 14, which is essentially saturated after a period of ion exchange, into a separation/regeneration column 16. With the invention this regeneration column 16 is the sole column for separation and regeneration of the anion and cation resins. As noted above, the ion resins 14 typically are very small polymer beads, technically 0.5 mm to 1 mm diameter. At this point the resin bed 14 has exchanged ions to remove contaminants in the working vessel to the extent it is no longer fully effective and must be regenerated.

FIG. 1 also shows a predetermined interface level 18 which, from the known volume of resin 14 to be introduced, will be the level of an interface between a cation layer and an anion layer, after the two layers have been separated. At this level is a draw-off for liquid, active during the later regeneration and rinsing steps. Also seen is a dashed line 20 indicating a level of an intermediate remaining layer from the previous resin batch regeneration procedure, as explained further below.

Figure 2:
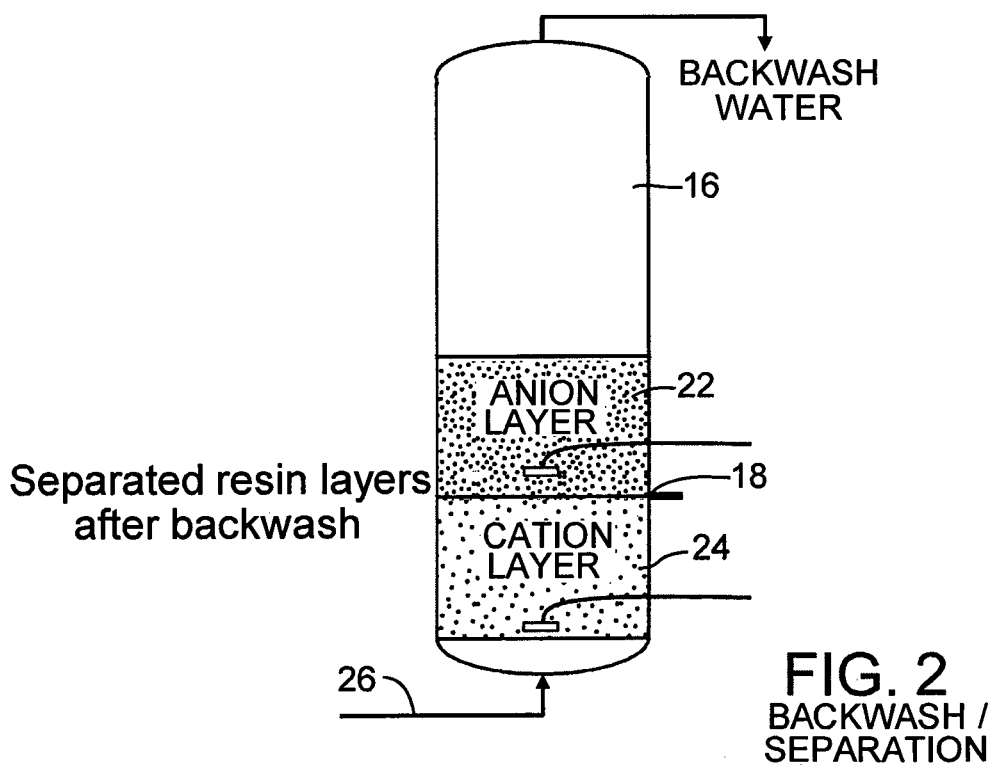
FIG. 2 is a schematic view indicating the resins separated into distinct layers, an anion resin layer and a cation resin layer.

FIG. 2 shows the separation/regeneration column 16 indicating the two separated layers, an anion resin layer 22 above a cation resin layer 24, following a backwash that causes the separation. An arrow 26 indicates backwash liquid (preferably water) which is directed up through the mixed resin after the resin's introduction as indicated in FIG. 1. The anion resin beads are less dense than the cation resin beads, thus the upflow backwash water separates the resin beads into two distinct layers. As indicated in the drawing, the interface between two layers occurs at the known predetermined interface level 18. The backwash water exits the column 16 via an overflow. Note that the column 16 is of considerably greater height than the two layers. Normally the height is about twice the height of the layers. As an example, the layers 22 and 24 may occupy about two meters of an overall cylindrical column height of about four meters.

Figure 3:
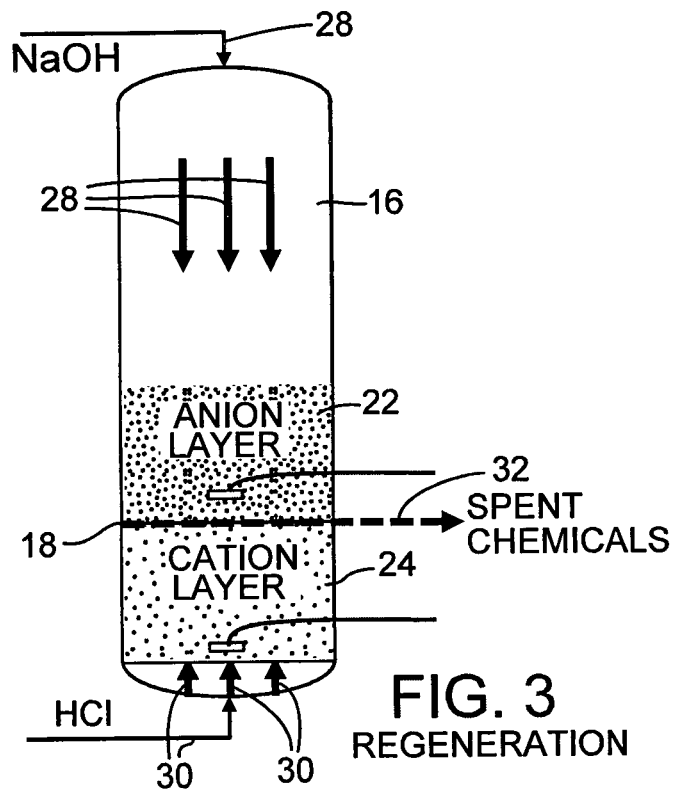
FIG. 3 is a schematic elevation view indicating regeneration chemicals being introduced into the column and withdrawn from an interface level between the layers.

FIG. 3 schematically indicates regeneration of the anion layer resin and the cation layer resin simultaneously. An alkaline solution, such as sodium hydroxide, is introduced from above, down into the anion layer, as indicated by the arrows 28. At the same time (or as a separate step as explained below), an acidic solution, such as hydrochloric acid, is introduced as an upflow regenerant, as indicated by arrows 30. The two regenerant liquids meet at the interface 18, and these spent chemicals are discharged from that level, as indicated by the discharge arrow 32. This can be via one or several ports around the periphery of the tank. Although some base solution will penetrate a short distance into the cation layer, and small amounts of acidic solution might penetrate slightly into the anion layer, the simultaneous upflow of acidic regenerant and downflow of basic regenerant causes nearly all of the spent regenerant liquid to exit at the level 18. As is well known, the alkaline regenerant removes the negatively charged ions of contaminant materials to regenerate the anion resin, while the acidic solution removes the positively charged ions of the cation layer to regenerate the cation resin.

The regeneration can also be done in two successive steps where only one chemical is introduced through one resin layer (caustic through anion layer or acid through cation layer) while water is introduced through the other layer for preventing cross-contamination at the interface level.

Figure 4:
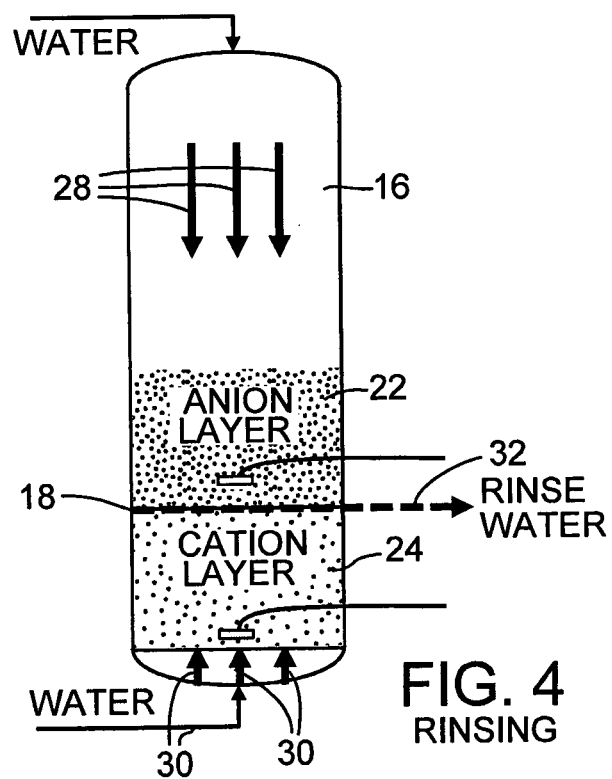
FIG. 4 is a similar schematic view showing rinse water being circulated through the regenerated anion and cation layers.

FIG. 4 indicates a rinsing step whereby rinse water is directed through the same path as were the regenerants, indicated by the arrows 28 and 30. This removes residual spent chemicals, exiting the column at the interface, indicated at the arrow 32.

Figure 5:
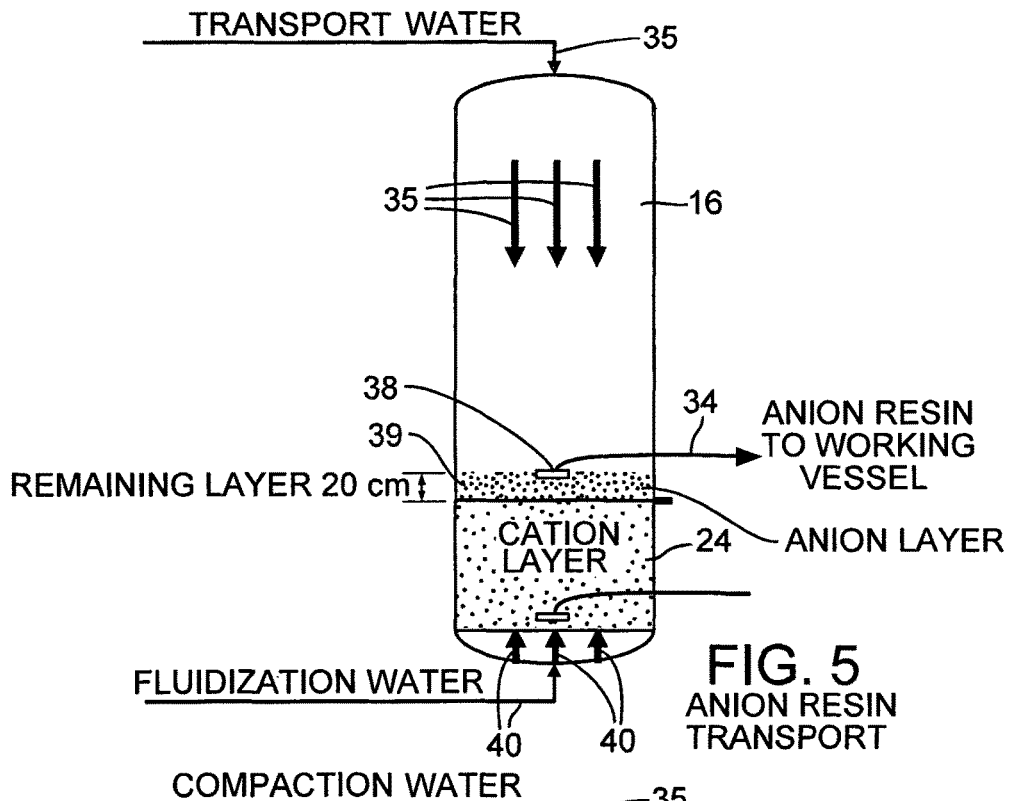
FIG. 5 is a similar schematic view indicating withdrawal of a well regenerated major portion of the anion layer, and showing a remaining layer from the bottom of the anion resin layer.

FIG. 5 indicates removal of most of the anion resin layer from the column, indicated at the arrow 34. Withdrawal is aided by transport water as indicated by arrows 35, flowing downwardly in the tank. Withdrawal of the anion resin is from a predetermined level 38 (via multiple outlet ports), so as to leave a selected small portion 39 of the anion resin layer behind in the tank. This can be, for example, an approximately 15 to 20 cm depth just above the interface, this portion 39 having considerable cross-contamination, in part from the opposing chemical regenerant which may have crossed over the interface so as to negate some of the regenerating effect, and also from some of the cation resin contaminating this region. A withdrawal conduit from a series of outlet ports is positioned at the preselected level 38; the conduit is not shown but is represented by the withdrawal arrow 34. FIG. 5 also indicates, with arrows 40, that fluidization water flows upwardly from the bottom of the column. This upflow, which is at a lower rate than that of the transport water 35, maintains the anion resin medium mobilized to assist in transporting the medium out of the tank as at 34. Note that the cation resin layer 24 remains in place.

Figure 6:
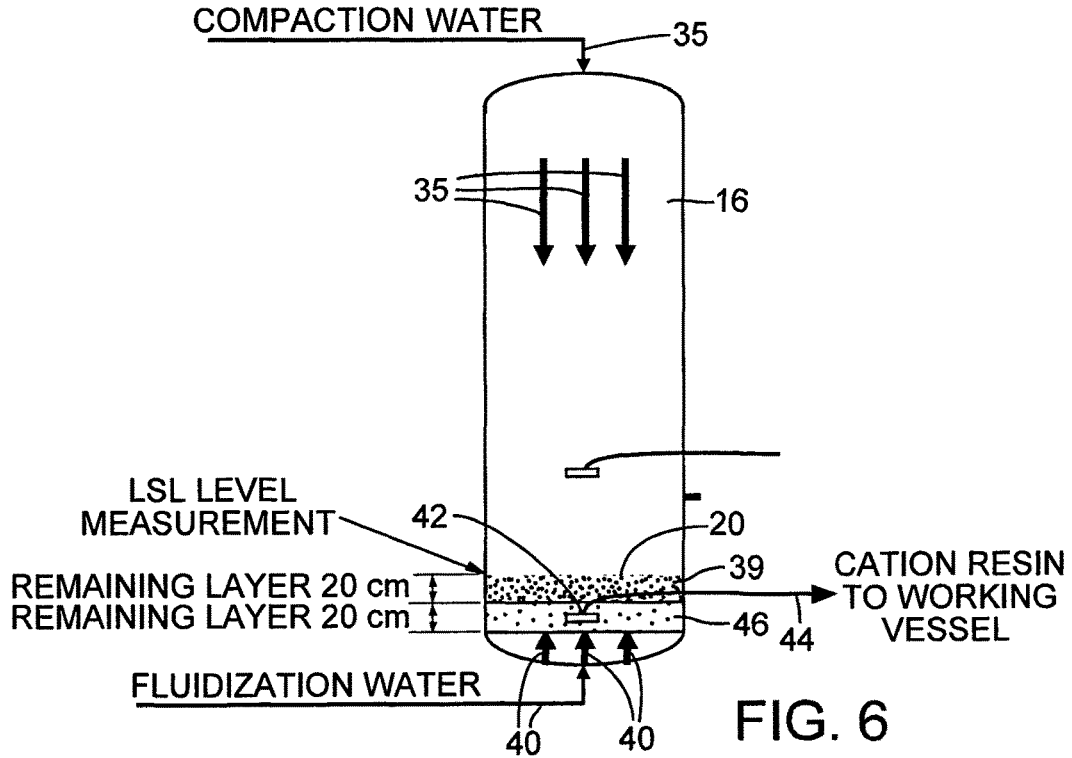
FIG. 6 is a similar view indicating the major portion of the cation layer being withdrawn from the column and showing a remaining top portion of the cation layer along with the bottom portion of the anion layer, these two layers being an intermediate zone with considerable cross-contamination.

Next, the major part of the cation resin layer is removed, as indicated in FIG. 6. This layer is removed from the bottom of the tank, at a level shown at 42, typically about 5 cm above the bottom plate of the tank (which allows for good fluidization of the cation resin during transport). The cation resin medium is transported out of the tank as indicated at an arrow 44 (representing transport through a conduit), via multiple outlet ports at that level. Withdrawal is aided by transport water as indicated by arrows 40, flowing upwardly in the tank. Compaction water is shown flowing downwardly at 35, at a low rate, assisting the removal of the cation layer. The withdrawal of the cation layer can be measured, and is stopped at a point where a remaining layer 46, primarily a cation resin medium from the top of the cation layer 24, is at a desired residual depth. As with the remaining anion layer 39, this residual cation layer 46 is preferably about 15 to 20 cm deep. The layer has considerable cross-contamination and thus is left in the column along with the cross-contaminated anion layer 39. The two layers 39 and 46, which together can be called an intermediate zone, reach to the level 20 indicated in FIG. 1, to be mixed with the next batch of mixed resin to be separated and regenerated.

The invention thus achieves the benefits of a two-column or three-column separation/regeneration system for mixed ion exchange resins, but utilizing only a single tank. The invention is less complex and costly than conventional regeneration system.

The above described preferred embodiments are intended to illustrate the principles of the invention, but not to limit its scope. Other embodiments and variations to these preferred embodiments will be apparent to those skilled in the art and may be made without departing from the spirit and scope of the invention.

I claim:

1. In an ion exchange water treatment system using a mixed bed separator with cation and anion resins, a method for regeneration of the cation and anion resins with minimal cross-contamination, comprising:
    transporting the mixed resins from a working vessel to a separation/regeneration column,
    separating the anion resins from the cation resins using an upflow of backflush water, thus to divide the bed into two well stratified cation and anion layers, with the anion layer above,
    regenerating the anion resin layer by flowing a regenerating alkaline liquid down through the anion layer, and regenerating the cation resin layer by flowing a regenerating acid liquid up through the cation resin layer, while withdrawing from the column the regenerating acid and alkaline liquids essentially at an interface between the anion and cation layers,
    rinsing the respective regenerated layers with water, thus resulting in two clearly differentiated layers of regenerated cation and anion resins, withdrawing most of the anion resin layer from the column, leaving a residual bottom portion of the anion resin layer remaining in the column, on top of the cation resin layer,
    withdrawing most of the cation resin layer from the column, from a withdrawal level essentially at the bottom of the column, leaving a residual portion of the cation resin layer remaining in the column, below the remaining anion bottom portion,
    leaving behind the residual bottom portion of the anion resin layer and the residual portion of the cation resin layer, the two portions together including cross-contamination, to remain in the separation/regeneration column, subsequently to be mixed with a bed of cation and anion resins in a succeeding cycle of resin regeneration, and
    reintroducing the withdrawn, regenerated anion resins and the withdrawn, regenerated cation resins to the working vessel,
    whereby the resins are regenerated with minimal cross contamination in a single separation/regeneration column.

2. The method of claim 1, wherein the anion resin and the cation resin are transported directly back to the working vessel on being withdrawn from the column.

3. The method of claim 1, wherein the regenerating of the anion resin layer and the regeneration of the cation resin layer are performed simultaneously.

4. The method of claim 1, wherein fluidization water is introduced up through the bottom of the column and through the cation layer during withdrawal of the anion resin layer, helping prevent contamination of the cation resin layer.

5. The method of claim 1, wherein fluidization water is directed from the bottom of the column up through the cation resin layer during withdrawal of the cation resin layer.

6. The method of claim 1, wherein transport water is introduced in the column from above the anion resin layer during anion resin withdrawal.

7. The method of claim 1, wherein the withdrawal level for the cation resin layer is about 5 cm above the bottom of the column, to allow fluidization by an upflow of fluidization water during cation resin withdrawal.

8. The method of claim 1, wherein each of the anion and cation portions remaining in the separation/regeneration column is about 15 to 20 cm deep.

9. The method of claim 1, including measuring withdrawal of the cation resin layer so as to leave a preselected depth of the cation layer remaining as said small portion of the cation layer.

* * * * *